Figure 1:
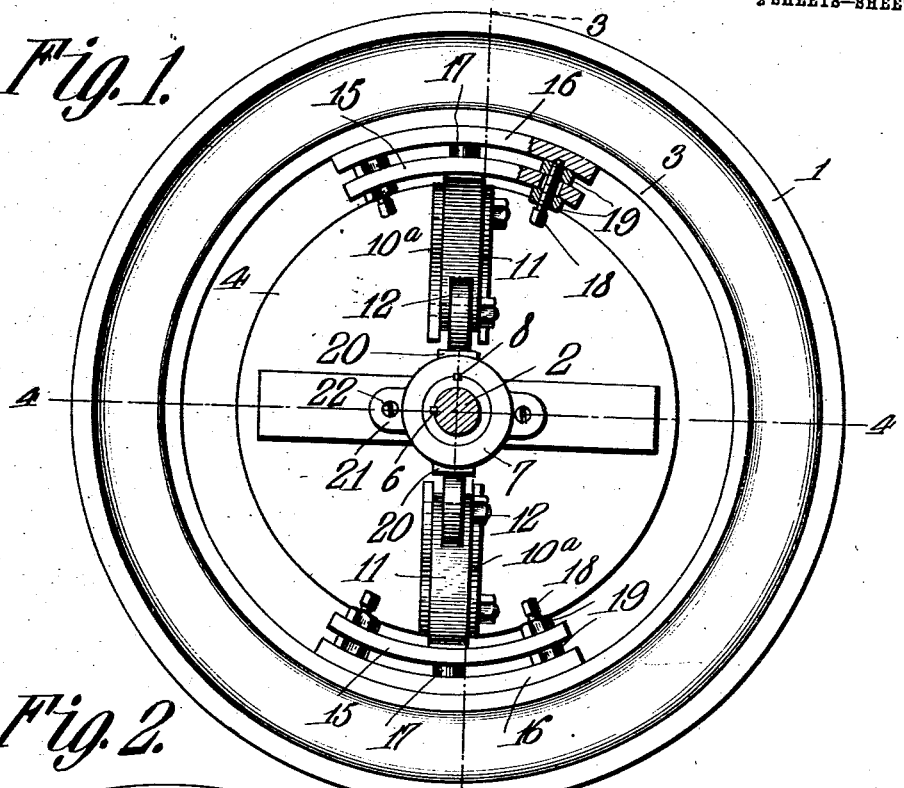

T. WHITE.
CLUTCH.
APPLICATION FILED MAR. 9, 1909.

943,208.

Patented Dec. 14, 1909.
2 SHEETS—SHEET 1.

Witnesses

Inventor
Tilman White.
By C. A. Snow & Co.
Attorneys

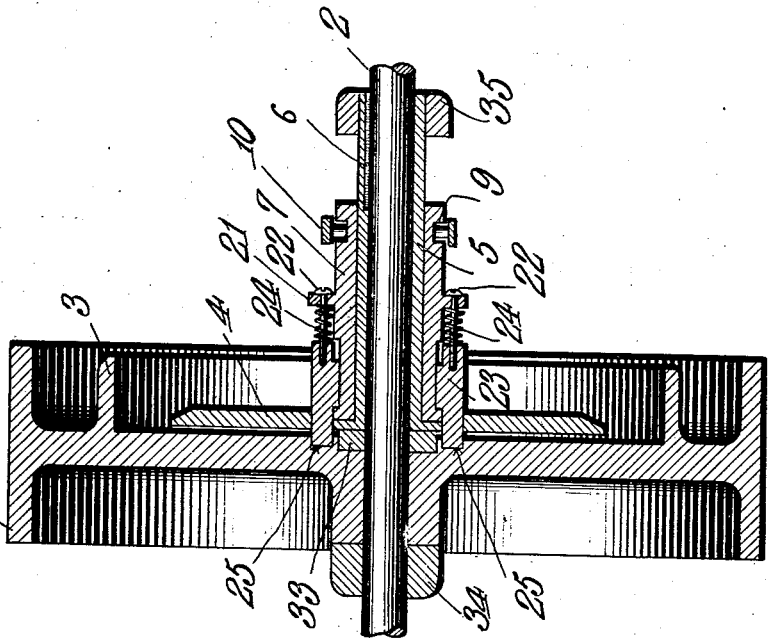
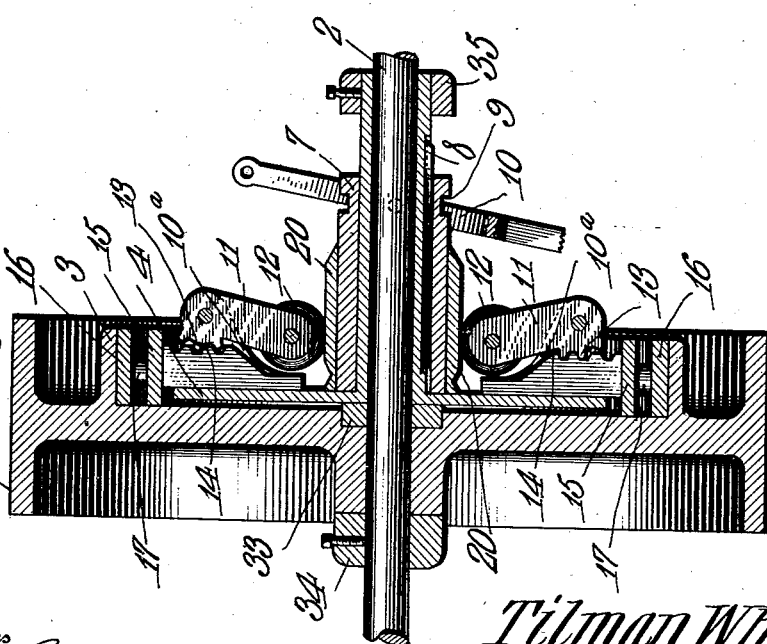

UNITED STATES PATENT OFFICE.

TILMAN WHITE, OF PORTLAND, OREGON.

CLUTCH.

943,208.  Specification of Letters Patent.  Patented Dec. 14, 1909.

Application filed March 9, 1909. Serial No. 482,331.

*To all whom it may concern:*

Be it known that I, TILMAN WHITE, a citizen of the United States, residing at Portland, in the county of Multnomah and State of Oregon, have invented a new and useful Clutch, of which the following is a specification.

This invention relates more particularly to a friction clutch, adapted to be used on line shafts, pulleys, hoisting engines, or any other places where parts of a machine or plant are to be stopped and started without shock, or where the speed of one part is to be varied at will while the speed of the other part remains constant.

The object of the invention is to provide a clutch of this character which will be cheap to manufacture, strong and positive in operation, durable, and easy of adjustment, thus causing a minimum wear on the sliding parts.

Another object of the invention is to provide the friction clutch member with positive locking means which are actuated after the friction clutch has been applied, thus preventing useless wear of the friction rim and shoes.

With the foregoing objects in view the invention consists in a novel construction and arrangement of parts to be hereinafter described and claimed, reference being had to the drawing hereto annexed in which—

Figure 2:
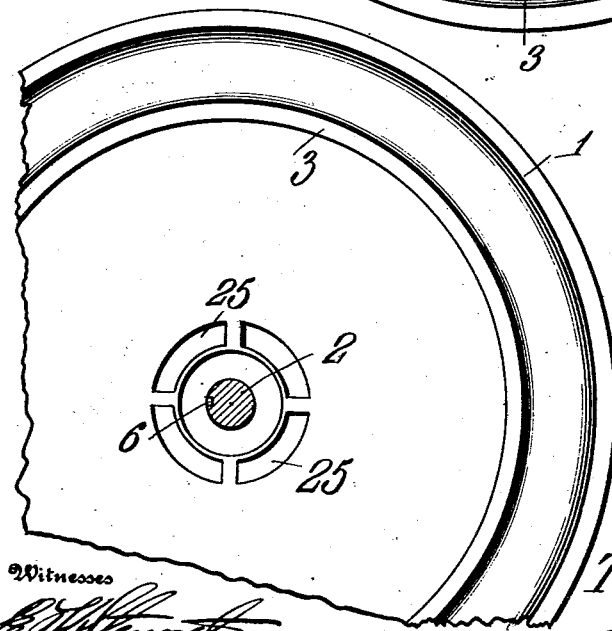
Figure 5:
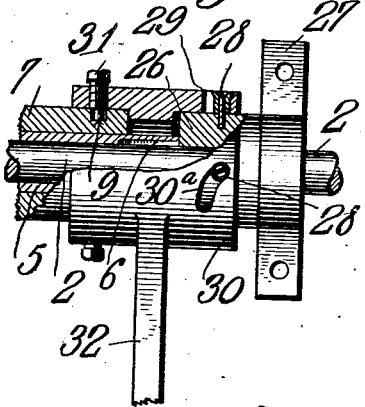

Figure 1 is a face view of the pulley and the clutch mechanism. Fig. 2 is a face view of the pulley with the clutch mechanism removed. Fig. 3 is a cross section on the line 3—3 of Fig. 1. Fig. 4 is a cross section on the line 4—4 of Fig. 1. Fig. 5 is a view similar to Fig. 4 showing the modification of the means for operating the clutch.

In the drawings, 1 indicates a pulley mounted on a shaft 2, and provided with a friction rim 3. On the shaft 2 is mounted a disk 4 integral with a bushing 5 made fast to the shaft by a key or other suitable means 6. On the bushing 5 is slidably mounted a shifting collar 7 which is prevented from rotating thereon by a spline 8. A circumscribing groove 9 in the collar is provided for connection to the usual shifting lever 10.

In the following description it will be assumed that the shaft 2 is vertically disposed, and that the shifting lever 10 is positioned above the pulley 1. The foregoing assumption is made merely, that the terms used hereinafter to define the location of parts, may be well understood, it being obvious that the shaft may be horizontally disposed as shown in Figs. 3 and 4, or otherwise positioned, as dictated by the exigencies of the proposed use.

On the disk 4 are formed ears $10^a$ between which are pivotally mounted levers 11 which are forked at their inner ends and carry between the branches of said forked ends, friction rollers 12. At their opposite ends, the levers are provided with segmental gear teeth 13 which are in mesh with the teeth of a rack 14 to which are secured segmental strips 15 supporting the friction shoes 16. Pins 17 project from the outer ends of the racks 14, and extend into openings in the shoes 16. Through the strips 15 are threaded screws 18 whereby an adjustable connection is had between the strips 15 and the shoes 16, said screws engaging the shoes, and being provided with lock nuts 19. By means of these screws the shoes may be adjusted to take up wear.

On the collar 7, opposite each of the rollers, are secured cam strips 20 so formed that when the collar is shifted upwardly, the rollers 12 will be elevated, and the racks and brake shoes withdrawn toward the center, and out of contact with the friction rim, and when the bushing is shifted downwardly, the cams depress the rollers 12, and hence carry the racks away from the center, and bring the shoes into binding contact with the friction rim 3.

On the shifting collar 7 are rigidly secured lugs 21 which are perforated to receive adjustable screws 22 which screw into sliding blocks or pawls 23 which pass through the disk 4. Springs 24 are coiled around the screws between the lugs 21 and the blocks 23. In the face of the web of the pulley 1, are made wedge-shaped depressions 25 in position to receive the ends of the pawls 23. The upper surfaces of the cam strips 20 have their faces parallel with the axis of the shaft, thus permitting the bushing 7 to be shifted to its extreme lowest position, and permitting the pawls 23 to enter the openings 25, and thus lock the two parts of the clutch securely together when turning forward.

When used as an ordinary friction clutch pulley, the form of shifter shown at 10, may preferably be used, and when used in machines of the hoister class, the shifting lever shown in Fig. 5 may be employed. The last-mentioned operating device consists of a collar 26 provided with extensions 27 for securing to a supporting member. In the collar 26 are rigidly secured one or more pins 28 extending outwardly, and provided with radially disposed anti-friction rollers 29. A sleeve 30 is rotatably mounted on the collar 26, and has in suitable positions, transverse arcuate slots 30ª adapted to receive the anti-friction rollers 29, and to be operated thereby. Screws 31 radially disposed in the sleeve 30 have their points extended into the groove 9 in the collar 7, and are thus adapted for shifting the latter longitudinally on the shaft. An arm 32 on the sleeve 30 is provided, for rotating the same through the required arc.

Suitable collars 33 and 34 retain the pulley 1 in its position on the shaft, and a collar 35 forms a stop for the collar 7.

The operation of the clutch is as follows. The shaft 2 being rotated by a source of power, carries with it the disk 4 and the parts mounted thereon. When the lever 10 and collar 7 is shifted to the position shown, the cam strips 20 pressing against the rollers 12, force the latter downwardly, and swing the levers 11 on their pivots, whereby, through the toothed segments and the racks, the shoes 16 are clamped firmly against the friction rim 3, thus throwing the clutch into operation. When the pulley 1 with its load, shall have attained approximately the speed of rotation of the shaft 2, a further shifting of the lever 10 and collar 7 downwardly, carries the latter to its extreme downward position, and thus brings the pawls 23 into engagement with the depressions 25 in the pulley web, and locks the pulley to the shaft positively, whereby useless wear of the sleeves 16 by slipping is prevented. A reverse movement of the lever 10 carrying the collar 7 to its extreme upward position, first disengages the pawls 23 from the pulley, and next brings the lower beveled portions of the cams 20 into engagement with the rollers 12, thus swinging the levers 11 in a direction to retract the rack 14, and thus bringing the shoes 16 out of engagement with the friction rim 3, whereby the clutch is released. When the shifting lever shown in Fig. 5 is used, the sleeve is rotated to the left, and being guided by the friction rollers 29, it will shift upwardly rapidly to withdraw the pawls 23, and then, because of the diminished obliquity of the cam slots, it will shift more slowly while releasing the friction shoes. It will be seen from Fig. 5 that the slots 30ª extend obliquely with respect to the axis of the shaft 2, the obliquity diminishing in the direction of one end of the slots.

What is claimed is:

1. The combination with a shaft and a pulley thereon having depressions in its face, of a friction rim on the pulley, a friction shoe engageable with said rim, a rack connected to the shoe, a lever provided with a toothed segment engageable with the rack, a cam sleeve slidably mounted on the shaft and engageable with the lever for operating the same, pawls carried by the sleeve and engageable with the depressions in the pulley, and means for operating the sleeve.

2. The combination with a shaft, and a pulley thereon having depressions in its face, of a friction rim on the pulley, a friction shoe engageable with said rim, a rack connected to the shoe, a lever provided with a toothed segment engageable with the rack, a cam sleeve slidably mounted on the shaft, and engageable with the lever for operating the same, ears projecting from the sleeve, and having apertures, screws passing through said apertures, pawls carried by said screws, and engageable with the depressions in the pulley, springs coiled around said screws between the pawls and the ears, and means for operating the sleeve.

3. The combination with a shaft, and a pulley thereon having depressions in its face, of a friction rim on the pulley, a friction shoe engageable with said rim, a rack connected to the shoe, a lever provided with a toothed segment engageable with the rack, a cam sleeve slidably mounted on the shaft, and engageable with the lever for operating the same, apertured ears projecting from the sleeve, pawls engageable with the depressions in the pulley and slidably mounted in the apertures in the ears, resilient means for actuating the pawls, and means for operating the sleeve.

4. A device of the class described comprising a shaft; a pulley journaled for rotation upon the shaft; a bushing rigidly assembled with the shaft and provided with an outstanding disk; a rack slidably mounted upon the disk; a friction shoe carried by the rack and arranged to engage the pulley; a lever fulcrumed upon the disk and having teeth to engage the rack; a roller carried by the lever; a collar slidably mounted upon the bushing and arranged to engage the roller; and means for reciprocating the collar.

5. A device of the class described comprising a shaft; a pulley journaled for rotation upon the shaft; a bushing rigidly assembled with the shaft and provided with an outstanding disk; a rack slidably mounted upon the disk; a friction shoe carried by the rack and arranged to engage the pulley; a lever fulcrumed upon the disk and having teeth to engage the rack; a roller carried by the lever; a collar slidably mounted upon the bushing; a cam strip carried by the bushing and arranged to engage the roller; and means for reciprocating the collar.

6. In a device of the class described, a collar, and means for assembling the same rigidly with a supporting element; a radially disposed anti-friction roller assembled with the collar; a sleeve rotatably mounted upon the collar and provided with a transverse, arcuate slot to engage the roller; a shaft; a pulley journaled for rotation on the shaft; a shifting collar slidably mounted on the shaft and terminally disposed within the sleeve, the portion of the shifting collar disposed within the sleeve being provided with a circumscribing groove; clutch mechanism to engage the pulley, assembled with the shifting collar; a radially disposed element carried by the sleeve and arranged to engage the circumscribing groove of the collar; and means for rotating the sleeve.

In testimony that I claim the foregoing as my own, I have hereto affixed my signature in the presence of two witnesses.

TILMAN WHITE.

Witnesses:
N. CAMPBELL,
GEO. W. MORGAN.